Figure 10:
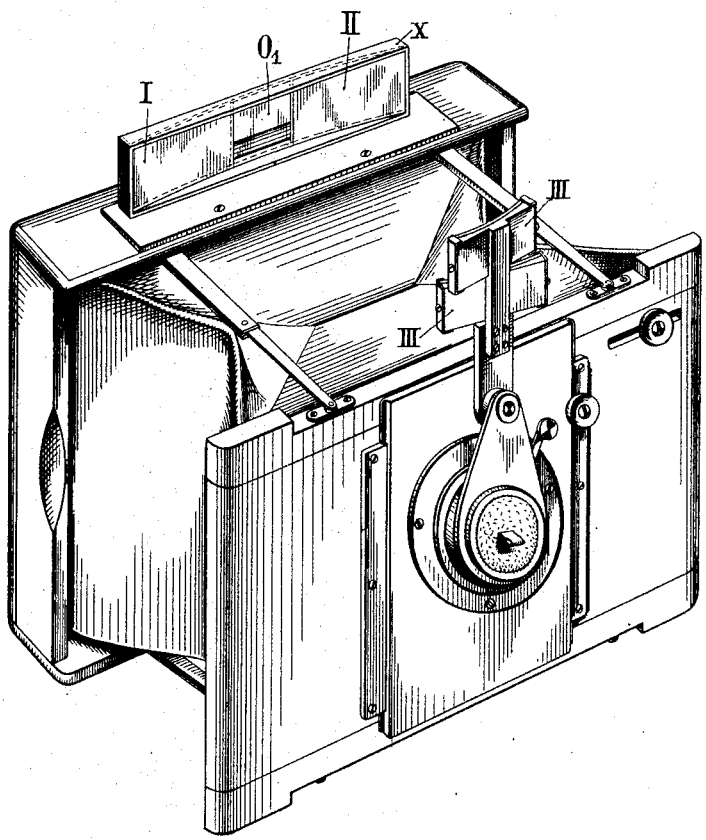

No. 886,739. PATENTED MAY 5, 1908.
W. THORNER.
DEVICE FOR FOCUSING PHOTOGRAPHIC CAMERAS.
APPLICATION FILED OCT. 9, 1906.
2 SHEETS—SHEET 1.
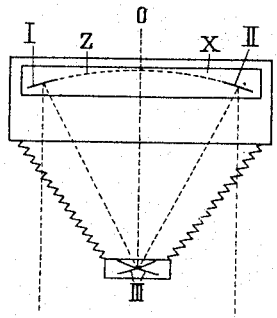
Fig.1.
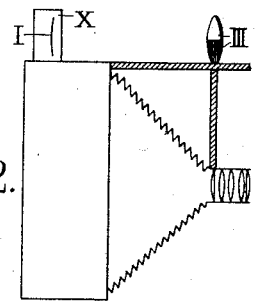
Fig.2.
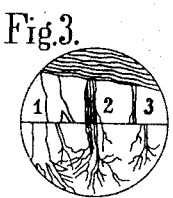
Fig.3.
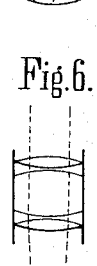
Fig.4.
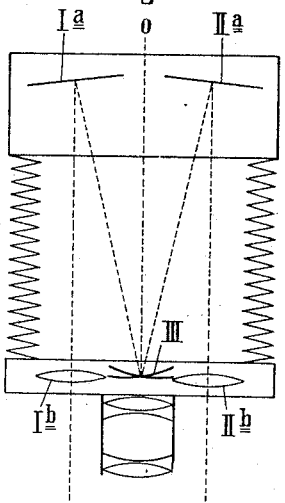
Fig.5.
Fig.6.
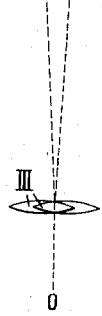
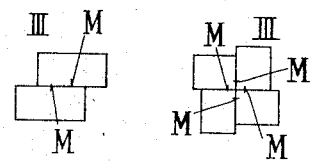
Fig.7. Fig.8.
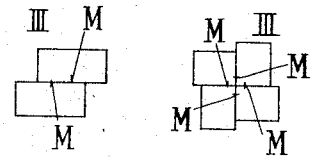
Fig.9.
Witnesses:
O. A. Foster
A. L. O'Brien
Inventor:
Walther Thorner
by
Dickerson, Brown, Raegener & Binney
Attys No. 886,739. PATENTED MAY 5, 1908.
W. THORNER.
DEVICE FOR FOCUSING PHOTOGRAPHIC CAMERAS.
APPLICATION FILED OCT. 9, 1906.

2 SHEETS—SHEET 2.

Witnesses:

Inventor:

UNITED STATES PATENT OFFICE.

WALTHER THORNER, OF BERLIN, GERMANY.

DEVICE FOR FOCUSING PHOTOGRAPHIC CAMERAS.

No. 886,739.  Specification of Letters Patent.  Patented May 5, 1908.

Application filed October 9, 1906. Serial No. 338,120.

*To all whom it may concern:*

Be it known that I, WALTHER THORNER, a citizen of the German Empire, residing at 118 Wilhelmstrasse, Berlin, Germany, physician, have invented certain new and useful Improvements in Devices for Focusing Photographic Cameras, of which the following is a specification.

My invention relates to a device for focusing photographic cameras without using a plate of ground glass. In order to secure this result I construct the focusing device in such a manner that it produces images of the objects upon which it is directed, which are more or less displaced with relation to each other or coincide, the degree of displacement depending upon the distance of the objects from the focusing device. The elements of the focusing device are arranged for rectilinear movement towards each other, such movement enabling coincidence of the images of objects at varying distances to be secured. This construction of the focusing device allows the focusing of the objective lens of the camera for objects at varying distances provided that the objective of the camera is moved with relation to the image carrying frame of the camera in accordance with the rectilinear movement of the elements of the focusing device towards each other.

The focusing of the objective lens of the camera is obtained in a very simple manner by directly connecting one element of the focusing device to the objective and the other to the image carrying frame of the camera. In this instance no coupling means for communicating the movement of the elements of the focusing device to the elements of the camera are necessary. Of course this embodiment of invention requires a special construction of the elements of the focusing device depending upon the nature of the objective of the camera.

For the purpose of practically carrying out the invention two images of the object for which the objective of the camera is to be focused are produced by reflecting or refracting spherical surfaces which are arranged at the ends of a base-line and which coöperate with an optical element adapted to bring these images into coincidence on rectilinear movement towards the image producing elements, the length and the direction of the rectilinear movement being either equal or in a definite proportion to the movement of the objective of the camera necessary for focusing the objective for the distance of the object in question.

The new focusing device is represented on the annexed drawing diagrammatically in four modifications.

Figures 1 and 2 represent diagrammatically a plan and a vertical section of the principal embodiment of the invention. Fig. 3 shows the images which are used for the adjustment of the device. Fig. 4 is an axial section through a photographic camera with a modification of the new focusing device. Fig. 5 is a plan of a camera with a further modification of the focusing device. Fig. 6 shows diagrammatically a further modification of the focusing device comprising the combination of an object glass forming the image producing element with two halves of a convex lens forming the image displacing element. Fig. 7 is an end view of the two halves of a convex lens forming the image displacing element of the focusing device represented in Fig. 6. Fig. 8 is an end view of a modified form of the image displacing element shown in Figs. 6 and 7. Fig. 9 shows a side elevation of a further modified form of the focusing device. Fig. 10 is a perspective view of a camera provided with a focusing device with the arrangement of the optical elements diagrammatically shown in Figs. 1 and 2.

In the embodiment of the invention represented in Figs. 1, 2 and 10 two small concave mirrors I and II are fixed on the outside of the camera. Preferably these two mirrors have a diameter of 2–3 cm. and about the same focal length as the objective of the camera and are located substantially in the plane of the sensitive sheet on which the image is to be produced by the objective of the camera. The mirrors I and II are fixed on a narrow ledge X. A third concave mirror III, having a diameter of about 4 cm. is arranged in the same height as the mirrors I and II and is firmly connected to the objective of the camera so that it is moved towards the mirrors I and II when the objective is moved towards the image plane. The mirror III consists of two halves which are located one above the other, with the reflecting surfaces at an angle with each other so that the one half has substantially the same direction as the mirror I and the other the direction of the mirror II. The focal length of these two parts of the mirror III is about one half of the focal length of the objective of the camera.

In the case of the construction represented in Fig. 2 the mirrors I, II and III are arranged at the rear side of the guiding board for the objective so that on using the camera the objective is suspended on its guiding board, the latter being located at the top end of the camera.

An observer viewing the mirror III from O (Fig. 1) or through the opening $O^1$ between the two mirrors I and II when using the embodiment shown in Fig. 10 now sees in the top-half of the mirror III the image of the objects projected thereon from I and in the bottom half the image projected thereon from II. The mirror III is arranged at such a distance from the mirrors I and II that when focusing the camera for an infinite distance, an infinitely remote perpendicular line appears to run continuously in the top and bottom halves of the mirror III. Each less distant perpendicular line appears however to be broken off and the two halves are wider apart, the closer the object is. If however the lens is moved away from the sensitive plate, and at the same time, the mirror III from the mirrors I and II, an infinitely remote perpendicular line will now appear to be broken off, while the image of a less distant perpendicular line is continuous, the coincidence of the two images of the same object always taking place, provided that the device is accurately adjusted, when the image is simultaneously focused on the ground glass plate. That which applies to the perpendicular lines also applies to any other line which intersects the dividing line in the middle of mirror III except that the relative displacement of both partial lines is not so great. The focusing is not possible on lines which run parallel with the dividing line on III, as such lines only appear to run into each other. If an object only consists of horizontal lines, the camera would have to be turned in order to be able to focus with the mechanism.

Fig. 3 shows the focusing of 3 differently remote trees. The apparatus is in focus for the tree 2, while the tree 1 is in front of and the tree 3 behind the accurately focused tree.

The focusing of an object is effected in a very simple manner in that the lens is moved until the object to be photographed appears continuous with the top and bottom halves of the mirror III.

Instead of providing two concave mirrors I and II separated from each other, the mirrors may be ground as parts of one single concave body, as shown in dotted lines in Fig. 1 the part Z between the mirrors I and II forming one piece together with the said mirrors. This construction is advisable in so far as the adjustment of the mirrors with relation to each other is dispensed with. If this construction is used the half of the radius of curvature must be equal to $\frac{18}{14}$ of the focal length of the objective, as can be found by calculation.

The whole focusing system may also be carried out in such a manner that prismatic convex lenses are employed instead of the inclined concave mirrors. The two image forming lenses must then be in the plane of the lens and the divided lenses uniting the image be in the plane of the sensitive plate. This construction is somewhat more awkward than that with concave mirrors but has the advantage that it yields accurate results for all ranges provided that the front focal points of the focusing lenses are located with that of the lens or object glass of the camera in the same plane perpendicular to the optic axis.

If concave mirrors are used as in the embodiment of invention represented in Figs. 1 and 2 a certain incorrectness is caused by the fact that the concave mirrors are lying behind the objective. This incorrectness, it is true, is insignificant if the objects for which the objective is to be focused are in a distance of more than 8 focal lengths. But it would be of practical influence if the distance of the objects is less than 8 focal lengths of the objective.

If it is not necessary to focus the image after the holder of the photographic plate has been inserted in the camera, for instance, in larger camera stands, the two image producing lenses I and II (Fig. 4) may be arranged on each side of and close to the lens or object glass and the lens III taking up the image may be replaced by the ground glass plate. The lenses I and II must then of course be covered before exposing the plate. An embodiment of this kind is represented in Fig. 4.

If lenses are used instead of concave mirrors in consequence of the prismatic effect of such lenses the images produced by the focusing device show colored edges, unless achromatic lenses or prisms are used. This imperfection is avoided in the construction represented in Fig. 5 showing plane mirrors $I^a$ and $II^a$ and convex lenses $I^b$ and $II^b$, the combination of the mirror $I^a$ and the lens $I^b$ forming a substitute for the prismatic lens I of Fig. 4 and the plane mirror $II^a$ and the convex lens $II^b$ forming in combination a substitute for the prismatic lens II of Fig. 4.

The focal length of each of the lenses $I^b$ and $II^b$ must be equal to the focal length of the objective of the camera multiplied by $\sqrt{2}$ if it is desired that the image is formed in the plane of the body III.

If one does not require high sensibility of the focusing device one needs only a short base-line. So it becomes possible to use the two halves of the objective of the camera as optical end-points of the base-line. This arrangement is represented in Fig. 6 of the drawing. In this instance the body III consists of a convex lens which is cut into two pieces which are shifted with relation to each other as shown in Fig. 7; the center being designated M. In this instance the body III consisting of two halves of a convex lens shifted with relation to each other may be cemented to the middle of the ground glass plate. This construction affords the advantage over the usual focusing of the objective by producing an image on the ground glass plate that is very luminous and can be adjusted without a dark-colored cloth.

In view of the fact that the object glass of the camera is symmetrical to the optical axis, it is possible to compose the device in the ground glass plate of a plurality of lens sections having their centers shifted with relation to each other. A modification of this kind with four lens sections is represented in Fig. 8, the centers of the lens sections being again marked M.

For finer adjustment it is advisable to use a magnifying glass for the contemplation of the optical element III of the focusing device; such magnifying glass in the case of Figs. 1, 5 and 6 could be arranged at O.

The optical element III in the construction of Figs. 7 and 8 could also be constructed by itself or in connection with a magnifying device as a focusing device separated from the photographic camera which in use is put on an opening in the rear-wall of the camera. This form of focusing device is represented in Fig. 9 in which the letter $a$ designates a magnifying convex-lens and the letter $b$, the body causing the images of objects at definite distances produced by different parts of the object glass to coincide, and at the same time a shifting of the images of objects at different distances with relation to each other.

I have shown and described the best means now known to me of embodying my invention without intending to limit myself to the exact constructions as described and shown except as required by the scope of the appended claims.

My new focusing device may be used in connection with any kind of camera provided with arbitrary fittings, for instance, finders, etc.

Having now described my invention what I claim and desire to secure by Letters Patent is:

1. In a device for focusing the lens of a photographic camera, image producing optical elements located at the ends of a base-line and image displacing optical elements coöperating with said image producing elements, said image producing and image displacing optical elements adjustable towards each other in rectilinear direction parallel to the axis of the camera lens and adapted to produce coincident images of each distant object on proper adjusting of their distance and means for adjusting the objective of the photographic camera with relation to the image plane of same in accordance with the adjustment of the image producing and image displacing elements of the focusing device.

2. In a device for focusing the lens of a photographic camera, image producing optical elements located at the ends of a base-line connected to the photographic camera, image displacing optical elements coöperating with said image producing elements and connected to a part of the camera adjustable with relation to that part which is in connection with said image producing elements, said image producing elements and said image displacing optical elements movable towards each other in rectilinear direction and adapted to produce coincident images of any object the image of which is in focus in the camera.

3. In a device for focusing the lens of a photographic camera, reflectors with substantially spherical reflecting surfaces at the ends of a base-line, said reflectors connected to the photographic camera, image displacing optical elements coöperating with said reflectors and connected to a part of the camera adjustable with relation to that part which is in connection with the said reflectors, said reflectors being located at the ends of the base-line and said image displacing optical elements movable towards each other in rectilinear direction and adapted to produce coincident images of any object the image of which is in focus in the camera.

4. In a device for focusing the lens of a photographic camera, reflectors with substantially spherical reflecting surfaces at the ends of a base-line, the reflecting surfaces of said reflectors forming part of one single spherical surface the reflectors connected to the photographic camera, image displacing optical elements coöperating with said reflectors and connected to a part of the camera adjustable with relation to that part which is in connection with the said reflectors, said reflectors at the ends of the base-line and said image displacing optical elements movable towards each other in rectilinear direction and adapted to produce coincident images of any object the image of which is in focus in the camera.

5. In a device for focusing the lens of a photographic camera, reflectors with substantially spherical reflecting surfaces at the ends of a base-line, said reflectors connected to the sensitive layer carrying frame of the photographic camera, image displacing optical elements coöperating with said reflectors and connected with the objective of the camera, said reflectors and said image displacing elements movable towards each other in rectilinear direction and adapted to produce coincident images of any object the image of which is in focus in the camera.

6. In a device for focusing the lens of a photographic camera, a pair of reflectors, one at each end of a base-line, a second pair of reflectors, the reflectors of the said second pair arranged in an angle with relation to each other, one reflector of the first pair coöperating with one reflector of the second pair, the reflectors of each of the two pairs being in invariable position with relation to each other and the pairs movable towards each other in rectilinear direction and the one pair in connection with the objective of the camera and the other with the image frame.

7. In a device for focusing the lens of a photographic camera, a pair of reflectors, one at each end of a base-line and connected to the image frame of the camera, a second pair of reflectors and a pair of lenses connected to the objective frame of the camera, the reflectors of the said second pair arranged in an angle with relation to each other, one lens and one reflector of the second pair acting in coöperation with one reflector of the said first pair of reflectors and the pairs of reflectors movable each as a whole towards each other in rectilinear direction.

In testimony whereof I have signed this specification in the presence of two subscribing witnesses.

WALTHER THORNER.

Witnesses:
HENRY HASPER,
WOLDEMAR HAUPT.